US008561085B2

(12) United States Patent
Nair et al.

(10) Patent No.: US 8,561,085 B2
(45) Date of Patent: Oct. 15, 2013

(54) SYSTEM AND METHOD FOR PROVIDING A COMMUNICATIONS FRAMEWORK

(75) Inventors: Suresh G. Nair, Robbinsville, NJ (US); Sundar Krishnamoorthy, Hightstown, NJ (US)

(73) Assignee: Bank of America Corporation, Charlotte, NC (US)

( * ) Notice: Subject to any disclaimer, the term of this patent is extended or adjusted under 35 U.S.C. 154(b) by 676 days.

(21) Appl. No.: 12/759,740

(22) Filed: Apr. 14, 2010

(65) Prior Publication Data

US 2011/0255480 A1    Oct. 20, 2011

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................... 719/318; 719/314

(58) Field of Classification Search
USPC ....................................................... 719/314
See application file for complete search history.

(56) References Cited

U.S. PATENT DOCUMENTS 7,240,199 B2 * 7/2007 Tomkow ........................ 713/168
8,023,971 B2 * 9/2011 Egli ................................ 455/466
2004/0002958 A1 * 1/2004 Seshadri et al. ................... 707/3
2004/0230695 A1  11/2004 Anschutz et al.
2007/0060174 A1   3/2007 Newton et al.
2008/0162637 A1 * 7/2008 Adamczyk et al. ........... 709/204

OTHER PUBLICATIONS

PCT Notification of Transmittal of the International Search Report and the Written Opinion of the International Searching Authority, or the Declaration with attached International Search Report and the Written Opinion of the International Searching Authority in PCT Application No. PCT/US 11/28617, dated May 19, 2011, 7 pages.

* cited by examiner

*Primary Examiner* — Emerson Puente
*Assistant Examiner* — Kimbleann Verdi
(74) *Attorney, Agent, or Firm* — Michael A. Springs (57) ABSTRACT

A system includes a queuing module coupled to a first database and a delivery module coupled to a second database and the queuing module. The queuing module is operable to receive a plurality of communications from a plurality of applications and store the plurality of communications in the first database. The delivery module is operable to receive the stored plurality of communications from the queuing module, access end-user subscription information stored in the second database, determine, based on the end-user subscription information, one or more devices to receive the plurality of communications, and deliver the plurality of communications to the determined one or more devices on behalf of the plurality of applications. The end-user subscription information indicates one or more devices to receive the plurality of communications.

16 Claims, 3 Drawing Sheets

SYSTEM AND METHOD FOR PROVIDING A COMMUNICATIONS FRAMEWORK

TECHNICAL FIELD OF THE INVENTION

The present invention relates generally to communications and more specifically to a system and method for providing a communications framework.

BACKGROUND OF THE INVENTION

Applications often generate messages that are intended to be communicated to end users. In order to successfully deliver the messages, however, applications must determine how and where to deliver the message and then subsequently execute the delivery of the message to the end user's device. Consequently, substantial processing overhead is required to manage the delivery of messages to end users.

SUMMARY OF THE INVENTION

In accordance with the present invention, the disadvantages and problems associated with processing and delivering communications between an application and end users have been substantially reduced or eliminated.

According to one embodiment of the present invention, a system includes a queuing module coupled to a first database and a delivery module coupled to a second database and the queuing module. The queuing module is operable to receive a plurality of communications from a plurality of applications and store the plurality of communications in the first database. The delivery module is operable to receive the stored plurality of communications from the queuing module, access end-user subscription information stored in the second database, determine, based on the end-user subscription information, one or more devices to receive the plurality of communications, and deliver the plurality of communications to the determined one or more devices on behalf of the plurality of applications. The end-user subscription information indicates one or more devices to receive the plurality of communications.

Certain embodiments of the disclosure may provide one or more advantages. An advantage of one embodiment may be that a communications framework may deliver communications to end-user devices on behalf of applications, thereby allowing the applications to "fire and forget" the communications to the end-user device. Another advantage of certain embodiments may be that applications may be developed and deployed quicker and more efficiently since they do not have to manage the delivery of communications to the end user's device.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
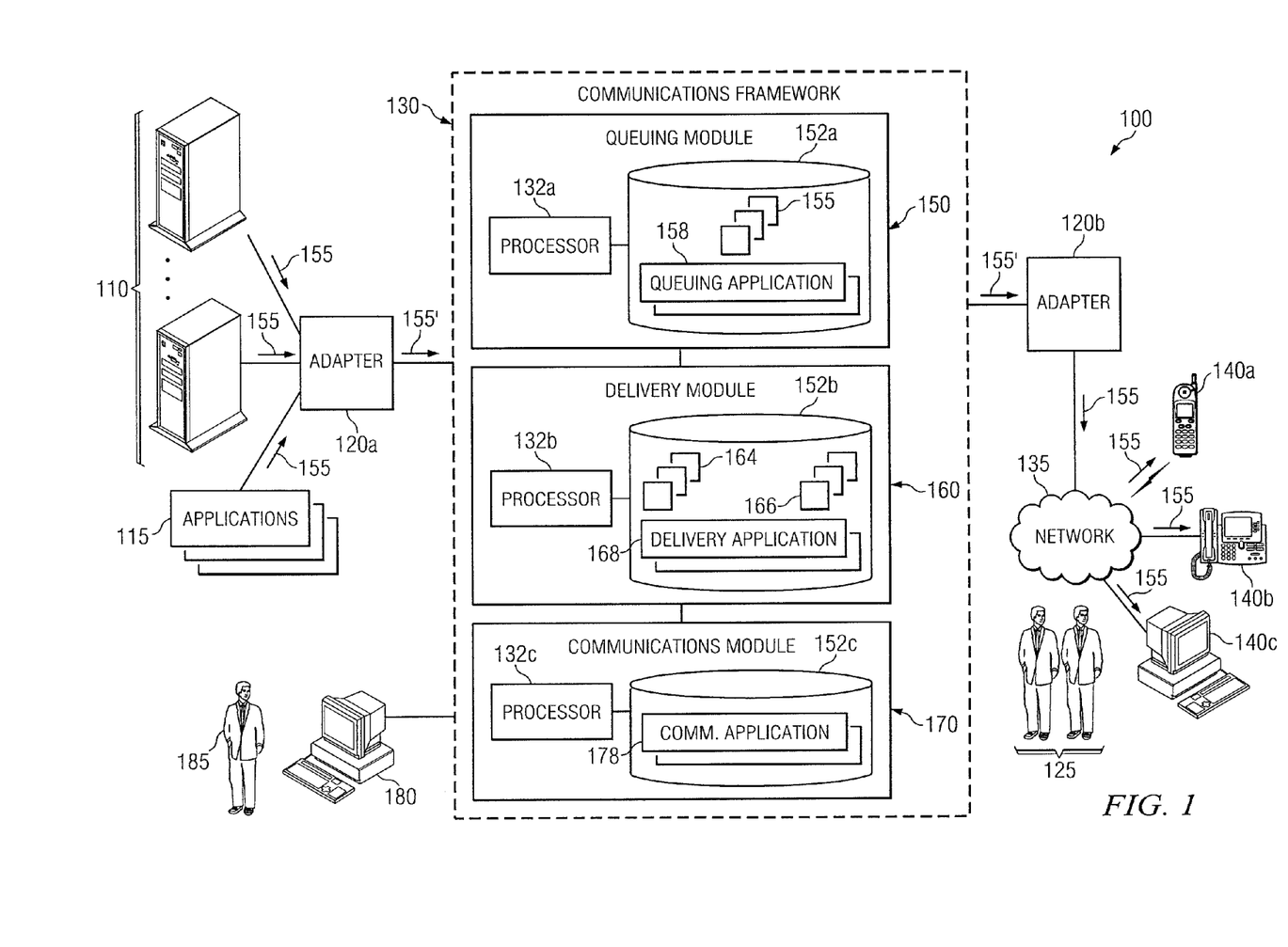
FIG. 1 illustrates a system for providing a communications framework, according to certain embodiments.
Figure 2:
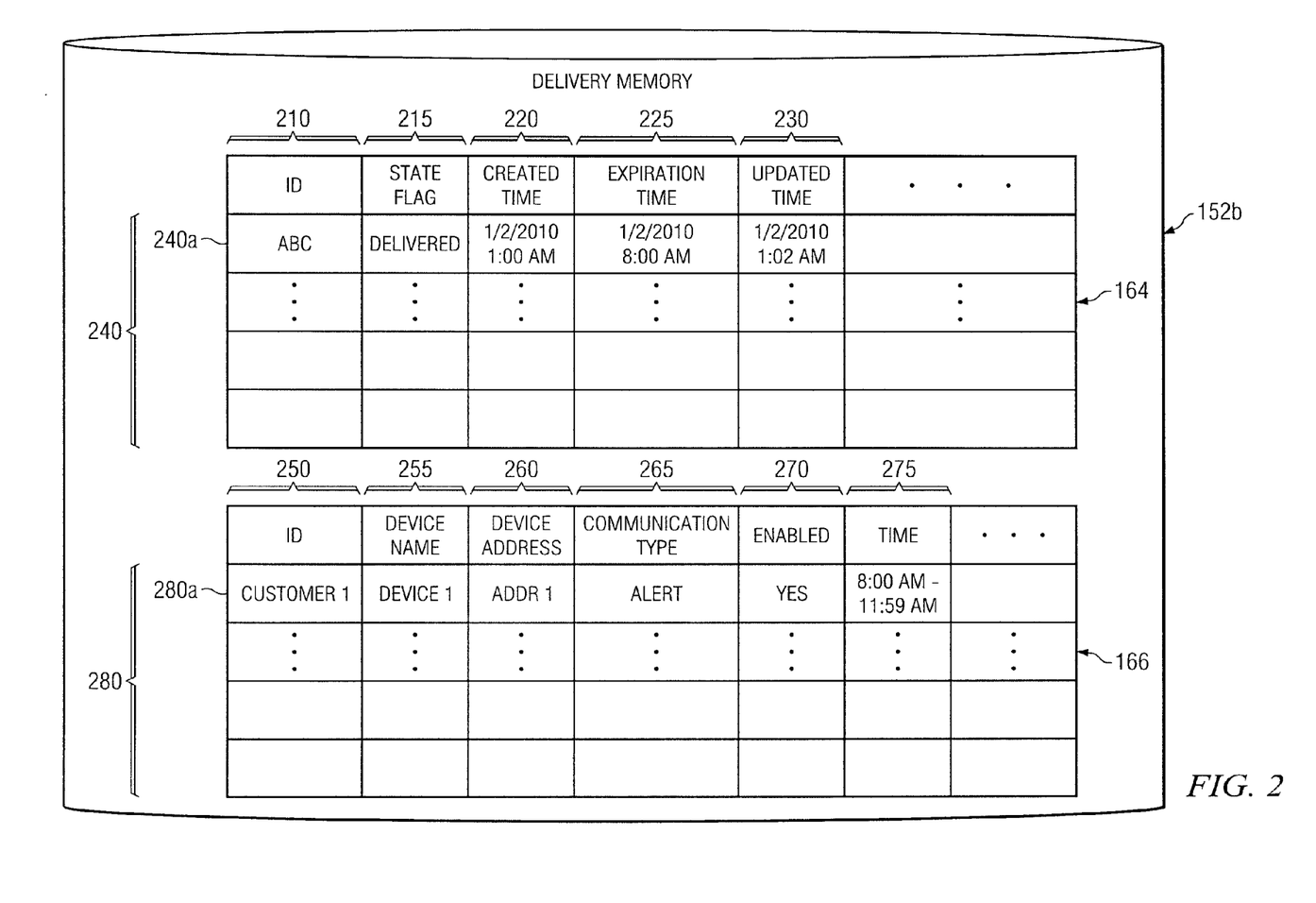
FIG. 2 illustrates communications history that may be stored and subscription information that may be utilized by the system of FIG. 1 to provide a communications framework, according to certain embodiments.
Figure 3:
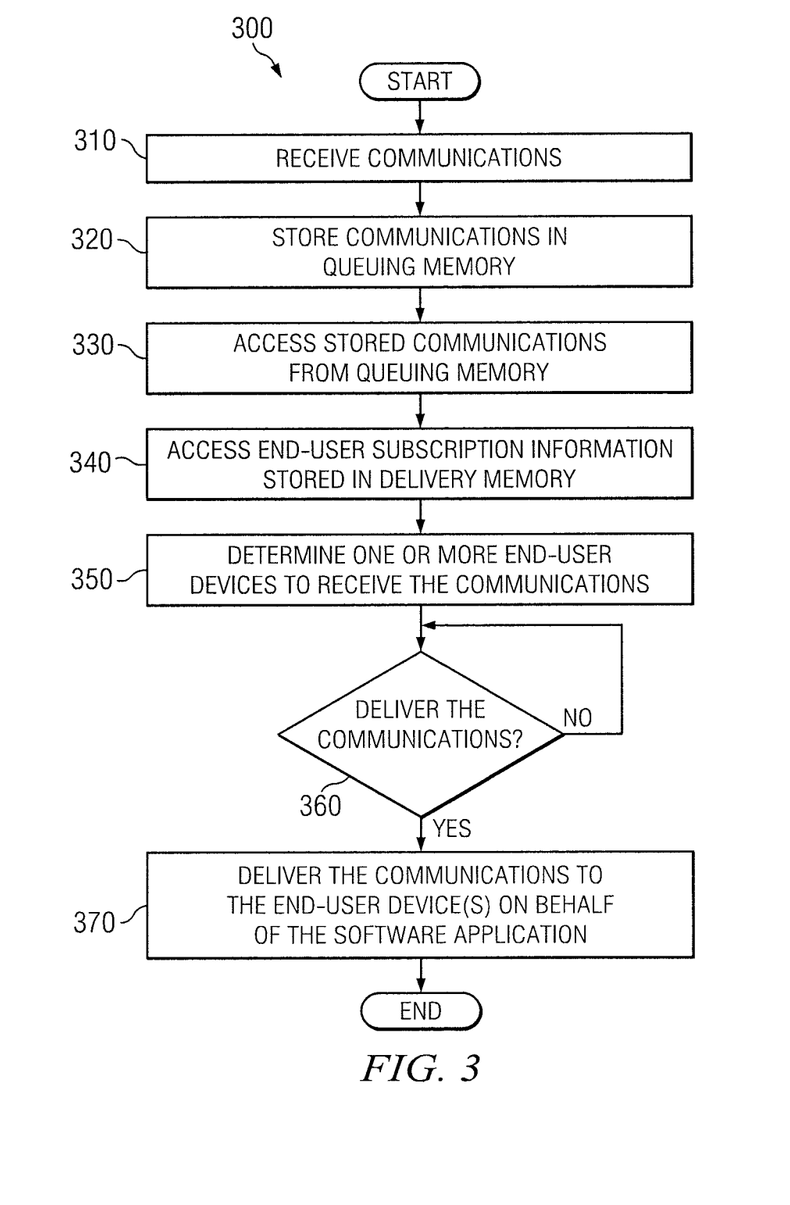
FIG. 3 illustrates a method for providing a communications framework, according to certain embodiments.

Embodiments of the present invention and its advantages are best understood by referring to FIGS. 1 through 3 of the drawings, like numerals being used for like and corresponding parts of the various drawings.

Applications often generate messages that are intended for communication to end users. For example, a financial advisor may place an order for the purchase of a specific number of shares of a stock using a financial services application. Once the order for the shares of stock has been executed, the financial services application may generate a message to inform the financial advisor that the order has been successfully executed. In order to successfully deliver the message to the financial advisor, however, the financial services application must determine how and where to deliver the message and then subsequently execute the delivery of the message to the financial advisor. This creates a significant amount of processing overhead for the financial services application, especially when the application must manage the delivery of multiple messages to multiple end users.

The teachings of the disclosure recognize that it would be desirable to provide a system and method for providing a communications framework to deliver communications to end users on behalf of the applications. FIGS. 1 through 3 below illustrate a system and method for providing a communications framework according to the teachings of the disclosure.

FIG. 1 illustrates a system 100 according to certain embodiments. System 100 may include one or more data servers 110, one or more applications 115, adapters 120a and 120b, a communications framework 130, end-user devices 140a-140c, and an administrator workstation 180. End-user devices 140a-140c may be utilized by one or more end users 125 and may be communicatively coupled to adapter 120b by a network 135. Data servers 110 and applications 115 may transmit communications 155 to communications framework 130 via adapter 120a.

In some embodiments, communications framework 130 includes a queuing module 150, which may include queuing memory 152a, and a delivery module 160, which may include delivery memory 152b. In some embodiments, communications framework 130 may additionally include a communications module 170. Communications framework 130 is generally operable to deliver communications 155 to end-user devices 140 on behalf of data servers 110 and applications 115, as described below. This allows data servers 110 and applications 115 to "fire and forget" communications 155, thereby eliminating the need for data servers 110 and applications 115 to execute and manage the delivery of communications 155. As a result, data servers 110 and applications 115 may be more quickly and efficiently developed and deployed.

In general, communications framework 130 delivers communications 155 to end-user devices 140 on behalf of data servers 110 and applications 115. Data servers 110 and applications 115 may first transmit communications 155 to communications framework 130 via adapter 120a. Queuing module 150 of communications framework 130 may receive communications 155' and store communications 155' in queuing memory 152a. Delivery module 160 of communications framework 130 may then receive the stored communications 155' from queuing memory 152a, access end-user subscription information 166 stored in delivery memory 152b, and determine, based on end-user subscription information 166, one or more end-user devices 140 to which the communications 155 should be transmitted. Communications framework 130 may then deliver communications 155 to end-user devices 140 on behalf of data servers 110 and applications 115.

Data servers 110 may refer to any device or system that supplies communications 155 to communications framework 130. In some embodiments, data servers 110 may include, for example, a mainframe, tandem, host computer, workstation, web server, file server, or any other suitable device operable to process and/or generate communications 155. Applications 115 may refer to any software application running on any computing device that is capable of generating communications 155. In some embodiments, applications 115 may be running on data servers 110. In some embodiments, applications 115 may be independent from data servers 110. It will be understood that system 100 may comprise any number and combination of data servers 110 and applications 115. Data servers 110 and applications 115 supply communications 155 to communications framework 130 via adapter 120a where communications 155' are stored. Communications 155' are subsequently delivered by communications framework 130 to adapter 120b, and adapter 120b forwards communications 155 to one or more end-user devices 140 on behalf of data servers 110 and applications 115.

In some embodiments, communications 155 may refer to any type of alerts indicating that a particular event has occurred. For example, an alert may be generated to indicate that a particular order by a financial advisor has been executed, that a particular order has been entered, or that a particular order has been cancelled. In some embodiments, communications 155 may additionally or alternatively refer to any type of notification. For example, a notification may be generated as a receipt for compliance and/or audit purposes. As used herein, "communication", such as communications 155, refers to an alert and/or a notification.

Communications 155 may include any suitable information to facilitate delivery. For example, each communication 155 may be an electronic data file written in the Extensible Markup Language (XML) and may include a unique message identification, a time that the communication 155 expires, and a message payload that contains the message to end user(s) 125. In some embodiments, communications 155 may include a "recipients" field that may indicate the intended recipient(s) of communications 155. In some embodiments, for example, the "recipients" field of communications 155 may include one or more of the following elements for identifying the intended recipient(s) of communications 155: LocationID, RoleID, LogonID, and EmailID. In some embodiments, the LocationID element may identify a particular location where communications 155 should be delivered. For example, LocationID may be the name of a particular city, and all end-user devices 140 located in the particular city should receive the communications 155. In some embodiments, the RoleID element may identify a group of people having a particular role or title that should receive communications 155. For example, LocationID may be "financial advisors," indicating that all people holding the title of a "financial advisor" are intended recipients of the communications 155. In some embodiments, the LogonID element may identify a particular user name of an end user 125 as the intended recipient of communications 155. In some embodiments, the EmailID element may identify a particular email address of an end user 125 as the intended recipient of communications 155.

Adapters 120 may refer to any software or hardware device capable of translating and/or consolidating communications 155 to/from a format compatible with communications framework 130 (i.e., communication 155'). In certain embodiments, data servers 110 and applications 115 transmit communications 155 to adapter 120a, and adapter 120a transmits communications 155' to communications framework 130. In this embodiment, adapter 120a translates communications 155 into a suitable format for communications framework 130. In some embodiments, communications framework 130 may transmit communications 155' to adapter 120b, and adapter 120b transmits communications 155 to end-user devices 140. Adapter 120a may also consolidate multiple communications 155 into a single communication 155. In some embodiments, for example, adapters 120 may refer to middleware.

In certain embodiments, network 135 may refer to any interconnecting system capable of transmitting audio, video, signals, data, messages, or any combination of the preceding. Network 135 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, end users 125 refer to any intended user(s) or customer(s) of communications 155. In some embodiments, for example, end users 125 may be financial advisors. In other embodiments, end users 125 may be employees of a financial institution such as a bank or brokerage firm.

In some embodiments, end-user devices 140a-140c may be particular devices utilized by end users 125 that are capable of receiving and displaying communications 155. In some embodiments, for example, system 100 may include an end-user device 140a, which may be a cellular/wireless telephone such as a smart phone or a Blackberry™ device. In some embodiments, system 100 may include an end-user device 140b, which may be a telephone compatible with a PSTN and/or a voice-over-IP (VoIP) telephone. In some embodiments, system 100 may include an end-user device 140c, which may be a personal computer and/or a laptop computer. In some embodiments, end-user device 140c may refer to a web application and/or a computer application. While particular end-user devices 140 have been listed for illustrative purposes, it should be noted that end-user devices 140 may be any electronic device or software application capable of receiving and displaying communications 155.

In some embodiments, communications framework 130 may be a part of a financial institution, such as a bank, and may include queuing module 150, delivery module 160, and a communications module 170. In some embodiments, modules 150, 160, and 170 may refer to any suitable combination of hardware and/or software implemented in one or more modules to process data and provide the described functions and operations. In some embodiments, modules 150, 160, and 170 may include, for example, a mainframe, server, host computer, workstation, web server, file server, a personal computer, such as a laptop, or any other suitable device operable to process data. In some embodiments, modules 150, 160, and 170 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In some embodiments, modules 150, 160, and 170 may include a processor 132 coupled to memory 152. For example, queuing module 150 may include processor 132a coupled to queuing memory 152a, delivery module 160 may include processor 132b coupled to delivery memory 152b, and communications module 170 may include processor 132c coupled to communications memory 152c. Memory 152a-152c may refer to any suitable device capable of storing and facilitating retrieval of data and/or instructions. Examples of memory 152a-152c include computer memory (for example, RAM or ROM), mass storage media (for example, a hard disk), removable storage media (for example, a CD or a DVD), database and/or network storage (for example, a server), and/or or any other volatile or non-volatile computer-readable memory devices that store one or more files, lists, tables, or other arrangements of information. Although FIG. 1 illustrates memory 152a-152c as internal to modules 150, 160, and 170, it should be understood that memory 152a-152c may be internal or external to modules 150, 160, and 170, depending on particular implementations. Also, memory 152a-152c may be separate from or integral to other memory devices to achieve any suitable arrangement of memory devices for use in system 100.

Queuing memory 152a is generally operable to store communications 155' and one or more queuing applications 158. Queuing application 158 generally refers to logic, rules, algorithms, code, tables, and/or other suitable instructions for performing the described functions and operations of queuing module 150, as described below. In certain embodiments, queuing module 150 may be a Microsoft™ server and queuing memory 152a may be a Microsoft™ SQL database.

Delivery memory 152b is generally operable to store communications history 164, end-user subscription information 166, and one or more delivery applications 168. Delivery application 168 generally refers to logic, rules, algorithms, code, tables, and/or other suitable instructions for performing the described functions and operations of delivery module 160, as described below. In certain embodiments, delivery module 160 may be a Microsoft™ server. FIG. 2 illustrates certain embodiments of communications history 164 and end-user subscription information 166 that may be stored in delivery memory 152b. End-user subscription information 166 may be utilized by delivery application 168 to deliver communications 155 to end-user devices 140 on behalf of data servers 110 and applications 115.

Communications memory 152c is generally operable to store one or more communication applications 178. Communication application 178 generally refers to logic, rules, algorithms, code, tables, and/or other suitable instructions for performing the described functions and operations of communication module 170, as described below. In certain embodiments, communication module 170 may be a Microsoft™ Live Communication Server that utilizes Session Initiation Protocol (SIP) to deliver communications 155 to end-user devices 140.

Queuing memory 152a, delivery memory 152b, and communications memory 152c are communicatively coupled to processors 132a, 132b, and 132c, respectively. Processors 132 are generally operable to execute applications 158, 168, and 178 stored in memory 152. Processors 132 may comprise any suitable combination of hardware and/or software implemented in one or more modules to execute instructions and manipulate data to perform the described functions for communications framework 130. In some embodiments, processors 132 may include, for example, any type of central processing unit (CPU).

In general, administrator 185 may interact with communications framework 130 using an administrator workstation 180. In some embodiments, administrator workstation 180 may be communicatively coupled to communications framework 130 and may refer to any suitable computing system, workstation, personal computer, such as a laptop, or any other device operable to process data. In certain embodiments, administrator 185 may utilize an administrator console on administrator workstation 180 to manage the delivery of communications 155 by communications framework 130.

In an exemplary embodiment of operation, communications framework 130 delivers communications 155 to end-user devices 140 on behalf of data servers 110 and applications 115, thereby allowing data servers 110 and applications 115 to simply "fire and forget" communications 155. To deliver communications 155 to end-user devices 140, data servers 110 and/or applications 115 first generate communications 155.

As an example for illustrative purposes only, a data server 110 may generate a communication 155 indicating that a financial advisor's previously entered order has been executed. After generating communication 155, data servers 110 and/or applications 115 may transmit communication 155 to adapter 120a. As previously described above, adapter 120a may in some embodiments be middleware that translates communication 155 to a format suitable for communications framework 130. After performing any necessary translation of communication 155, adapter 120a then transmits communication 155' to communications framework 130.

Next, communication 155' is received by communications framework 130 from adapter 120a. In some embodiments, queuing module 150, by utilizing one or more queuing applications 158, receives communication 155' and stores communication 155' in queuing memory 152a. In certain embodiments, queuing applications 158 may include the Microsoft™ SQL Notification Service.

After communication 155' is received and stored in queuing memory 152a, it may then be transmitted to delivery module 160. Once communication 155' is received from queuing memory 152a, delivery module 160 utilizes one or more delivery applications 168 to determine the intended recipient(s) of communication 155'.

Once the intended recipient(s) of communication 155' from queuing memory 152a is determined, the one or more delivery applications 168 of delivery module 160 then access end-user subscription information 166 stored in delivery memory 152b in order to determine how to deliver communication 155' to the determined intended recipient(s). To determine how to deliver communication 155' to the determined intended recipient(s), the one or more delivery applications 168 may locate end users 125 in end-user subscription information 166 that match the determine intended recipient(s) of communications 155'. Once end users 125 that match the determined intended recipient(s) of communications 155' are located in end-user subscription information 166, delivery applications 168 may then read the delivery preferences of the located end users 125 in end-user subscription information 166.

As described in more detail below in reference to FIG. 2, end-user subscription information 166 includes end users' 125 preferences regarding the delivery of communications 155. In some embodiments, for example, end-user subscription information 166 may include the name of one or more end-user devices 140 that end users 125 have chosen as devices that should receive communications 155. In some embodiments, end-user subscription information 166 may include the type of communications 155 end users 125 wish to receive and/or not receive. In some embodiments, end-user subscription information 166 may include a range of time in which end users 125 wish to receive and/or not receive communications 155.

Once the delivery preferences of the intended recipient(s) of communication 155' (i.e., end users 125) have been determined from end-user subscription information 166, the one or more delivery applications 168 of delivery module 160 may then deliver communication 155' to adapter 120b according to end-users' 125 delivery preferences. Adapter 120b translates communication 155' into a format appropriate for end-user devices 140 and transmits communication 155 to end-user devices 140. The delivery of communication 155 to end-users devices 140 is performed on behalf of data servers 110 and applications 115, eliminating the need of data servers 110 and applications 115 to manage the delivery of communications 155 that they generate.

In some embodiments, communications framework 130 may additionally or alternatively utilize communication module 170 to deliver communication 155 to end-user devices 140 on behalf of data servers 110 and applications 115. In embodiments that utilize communication module 170 to deliver communication 155 to end-user devices 140, delivery module 160 transmits communication 155' to communication module 170. Communication module 170 may then deliver the received communication 155' to adapter 120b, and adapter 120b transmits communication 155 to end-user devices 140 using SIP messaging.

In some embodiments, delivery module 160 may additionally receive one or more confirmations indicating whether or not communications 155 were successfully delivered to end-user devices 140. In some embodiments, the received confirmations may be utilized for archival, audit, and/or compliance purposes. Once the one or more confirmations are received, the one or more delivery applications 168 of delivery module 160 may then store the confirmations in delivery memory 152b on behalf of data servers 110 and applications 115, thereby eliminating the need of data servers 110 and applications 115 to receive and store confirmations for communications 155 they generate. In certain embodiments, the one or more confirmations may be stored in communications history 164 of delivery memory 152b. A particular embodiment of communications history 164 is described in more detail below in reference to FIG. 2.

In some embodiments, applications 158, 168, and 178 may be logic encoded in one or more tangible, non-transitory media and may perform operations when executed by a computer. As used herein, logic may include a computer program, software, computer executable instructions, and/or instructions capable of being executed by a computer system. In particular embodiments, the operations of the embodiments may be performed by one or more computer readable media storing, embodied with, and/or encoded with a computer program and/or having a stored and/or an encoded computer program.

As previously described, delivery memory 152b may include communications history 164 and end-user subscription information 166. For example, FIG. 2 illustrates certain embodiments of communications history 164 and end-user subscription information 166 that may be utilized by the one or more delivery applications 168 of delivery module 160 to deliver communications 155 to end-user devices 140 on behalf of data servers 110 and applications 115.

In certain embodiments, communications history 164 has a schema that includes an identification (ID) field 210, a state flag field 215, a created time field 220, an expiration time field 225, and an updated time field 230. Communications history 164 includes a plurality of entries 240. Each entry 240 corresponds to a communication 155 handled by communications framework 130.

ID field 210 refers to a unique identification of each communication 155. For example, an entry 240a of communications history 164 includes an ID 210 of "ABC" from a particular communication 155. Data in ID fields 210 may be any combination of letters and/or numbers that may be utilized to uniquely identify communications 155.

State flag field 215 refers to the current delivery state of communications 155. For example, entry 240a of communications history 164 includes a state flag 215 of "delivered," indicating that the communication 155 having an ID 210 of "ABC" was delivered to the appropriate end user(s) 125. Data in state flag field 215 may be any appropriate state of communications 155, including, but not limited to, "not delivered," "delivered and read," "delivered but not read," and "pending."

Created time field 220 refers to the time each communications 155 was created. For example, entry 240a of communications history 164 includes a created time 220 of "1/2/2010 1:00AM," indicating that the communication 155 having an ID 210 of "ABC" was created on Jan. 2, 2010 at 1:00 AM. Data in created time fields 220 may be extracted from each communication 155 or generated by delivery module 160.

Expiration time field 225 refers to a time each communications 155 expires. For example, entry 240a of communications history 164 includes an expiration time 225 of "1/2/2010 8:00AM," indicating that the communication 155 having an ID 210 of "ABC" expires on Jan. 2, 2010 at 8:00 AM. Data in expiration time fields 220 may be extracted from each communication 155 and indicates a time that the communication 155 expires. After the time in expiration time field 220 passes, delivery module 160 no longer attempts to deliver the communication 155.

Updated time field 230 refers to a time that the status of each entry 240 is updated by delivery module 160. For example, entry 240a of communications history 164 includes an updated time 235 of "1/2,2010 1:02AM," indicating that entry 240a was last updated on Jan. 2, 2010 at 1:02 AM. In some embodiments, updated time field 230 refers to a time that state flag field 215 is updated.

In operation, delivery module 160 creates and updates entries 240 for communications 155 generated by data servers 110 and/or applications 115. In an exemplary embodiment, delivery module 160 creates entry 240a in communications history 164 as shown in FIG. 2 for a particular communication 155 stored in queuing memory 152a having an ID of "ABC." In this example, delivery module 160 may initially store "ABC" in ID field 210 and "1/2/2010 8:00AM" in expiration time field 225 according to data contained in communication 155. Delivery module 160 may also store the time that communication 155 was received from queuing memory 152a in created time field 220 and updated time field 230. In addition, delivery module 160 initially may store the value of "pending" or a similar value in state flag 215 to indicate that the communication 155 has not yet been delivered.

After communication 155 has been delivered, delivery module 160 may update the values in state flag field 215 and updated time field 230. For example, delivery module 160 may receive a confirmation that communication 155 has been successfully delivered to the intended end user(s) 125. After receiving the confirmation, delivery module 160 may update state flag 215 according to information in the confirmation. For example, if the confirmation indicates that the communication 155 was successfully delivered to and read by the intended end user(s) 125, delivery module 160 may store a value of "delivered and read" or similar value in state flag 215 and then store the current time in updated time field 230. In another example, if the confirmation indicates that the communication 155 was successfully delivered to but not yet read by the intended end user(s) 125, delivery module 160 may store a value of "delivered but not read" or similar value in state flag 215 and then store the current time in updated time field 230. By storing the history and status of communications 155 in communications history 164 on behalf of data servers 110 and applications 115, delivery module 160 provides a history of communications 155 that may be utilized for archival, audit, and/or compliance purposes. As a result, the need of data servers 110 and applications 115 to receive and store confirmations for communications 155 they generate is eliminated.

In certain embodiments, end-user subscription information 166 may include an ID field 250, a device name field 255, a device address field 260, a communication type field 265, an enabled field 270, and a time field 275. End-user subscription information 166 includes a plurality of entries 280. Each entry 280 corresponds to a subscription preference of a particular end user 125.

ID field 250 refers to a unique identification of a particular end user 125. For example, an entry 280a of end-user subscription information 166 includes an ID 250 of "customer1" for a particular end user 125. Data in ID fields 250 may be any unique identifier of end users 125. In certain embodiments, for example, ID field 250 may be an email address, a system username, a logon ID, or any other alpha-numeric identifier suitable for uniquely identifying end users 125.

Device name field 255 refers to a name and/or identifier of a particular device 140 that the particular end user 125 wishes to receive communications 155. For example, data in device name field 255 may indicate that end user 125 wishes to receive communications 155 on a desktop application, a web application, a mobile device, a standard telephone, or any other device 140 capable of receiving communications 155. Device address field 260 refers to the address of the device 140 indicated by device name field 255. In some embodiments, for example, device address field 260 may include a URL, and IP address, a telephone number, or any other appropriate address of the device 140 in device name field 255.

Communication type field 265 refers to the type of communication end user 125 wishes to receive on the device indicated by device name field 255. For example, data in communication type field 265 may indicate that end user 125 wishes to receive alerts, notifications, solicited communications 155, unsolicited communications 155, and/or any other appropriate type of communication 155 handled by communications framework 130.

Enabled field 270 refers to the current status of the particular entry 280 of end-user subscription information 166. For example, data in enabled field 270 may be "yes" or "1" to indicate that the particular entry 280 is currently enabled. On the other hand, if an end user 125 has disabled a particular entry 280, data in enabled field 270 may be "no" or "0" to indicate that the particular entry 280 is not active.

Time field 275 refers to a particular time that communications 155 may be delivered to the device 140 indicated by device name field 255. For example, time field 275 of entry 280a is "8:00AM-11:59AM," indicating that the particular end user 125 wishes to only receive communications 155 on the device 140 in device name field 255 between 8:00 AM and 11:59 AM. In certain embodiments, the time in time field 275 may indicate a range of time that end user 125 wishes to not receive communications 155.

In operation, delivery module 160 accesses end-user subscription information 166 in order to determine one or more devices 140 to receive communications 155. As an example, delivery module 160 may receive a communication 155 from queuing memory 152a having an intended recipient of "customer1." Delivery module 160 may then access end-user subscription information 166 in order to locate one or more entries 280 having an ID field 250 of "customer1." In this example, delivery module 160 may locate entry 280a having an ID 250 of "customer1" as shown in FIG. 2. Delivery module 160 may then access the corresponding device name field 255 in order to determine a device 140 to receive the communication 155.

In some embodiments, delivery module 160 may access device address field 260 in order to determine the address of the determined device 140 of device name field 255. In certain embodiments, delivery module 160 may access the communication type field 265 and the enabled field 270 in order to determine if the communication 155 matches the type of communication indicated in communication type field 265 and if the particular entry 280 is currently enabled. In some embodiments, delivery module 160 may access time field 275 in order to determine if the current time is within the indicated time range of time field 275. If communication 155 matches the data in communication type field 165, if the enable field 270 indicates that the particular entry 280 is currently enabled, and if the current time is within the indicated time range of time field 275, delivery module 160 may then attempt to deliver the communication 155 to the device 140 indicated in device name field 255 using the address indicated by device address field 260.

FIG. 3 illustrates one embodiment of a method 300 for delivering communications 155 to end-user devices 140 on behalf of data servers 110 and applications 115 as described above. Method 300 may be implemented, for example, by applications 158, 168, and/or 178 in modules 150, 160, and 170. Method 300 begins in step 310 where one or more communications are received. In some embodiments, the communications of step 310 may be communications 155 received by queuing module 150 of communications framework 130 after they are generated by data servers 110 and/or applications 115 as described above.

In step 320, queuing module 150 stores the received communications of step 310 in memory. In some embodiments, queuing module 150 stores the received communications 155 of step 310 in queuing memory 152a, as described above.

In step 330, delivery module 160 accesses the communications stored in step 320. In some embodiments, delivery module 160 retrieves communications 155 stored in queuing memory 152a. In other embodiments, queuing module 150 transmits communications 155 from queuing memory 152a to delivery module 160.

In step 340, end-user subscription information stored in delivery memory is accessed. In some embodiments, delivery module 160 first determines one or more intended recipients of communications 155, as described above. Delivery module 160 may then access the delivery preferences of the determined intended recipients in end-user subscription information 166, as described above.

In step 350, delivery module 160 determines one or more end-user devices to receive the communications of step 330. In some embodiments, delivery module 160 determines one or more end-user devices 140 to receive communications 155 using end-user subscription information 166, as described above.

In step 360, it is determined whether to deliver the communications of step 330 to the intended recipient(s). In some embodiments, delivery module 160 in step 340 determines that an end-user 125 has indicated a preference for when a communications 155 should be delivered as described above. Based on this preference, delivery module 160 in step 360 determines whether it currently is an appropriate time to deliver communications 155. If the current time is within the intended recipient's specified preference, delivery module 160 proceeds to step 370 and delivers communications 155. If the current time is not within the intended recipient's specified preference, delivery module 160 may proceed to wait in step 360 until the appropriate time.

In step 370, the communications of step 330 are delivered to the end-user devices determined in step 350 on behalf of the applications and/or servers that generated the communications. In some embodiments, delivery module 160 delivers communications 155 to end-user devices 140 on behalf of data servers 110 and applications 115, as described above. In some embodiments, delivery module 160 transmits communications 155 to communications module 170 and communications module 170 delivers communications 155 to end-user devices 140 using SIP messaging. Once communications 155 are delivered, method 300 ends.

Although the present invention has been described in detail, it should be understood that various changes, substitutions, and alterations can be made hereto without departing from the scope of the invention as defined by the appended claims.

What is claimed is:

1. A system, comprising:
   a queuing module comprising a first processor and coupled to a first database, the queuing module operable to:
      receive a plurality of communications from a plurality of applications; and
      store the plurality of communications in the first database;
   a delivery module comprising a second processor and coupled to a second database and the queuing module, the delivery module operable to:
      receive the stored plurality of communications from the queuing module;
      access end-user subscription information stored in the second database, the end-user subscription information indicating one or more devices to receive the stored plurality of communications;
      access communications history associated with the one or more devices to receive the stored plurality of communications, the communications history stored in the second database; and
      determine, based on the end-user subscription information and the communications history, the one or more devices to receive the stored plurality of communications; and
   an adapter comprising a third processor and coupled to the delivery module, the adapter operable to:
      receive, from the delivery module, the stored plurality of communications and the determined one or more devices to receive the stored plurality of communications;
      translate the stored plurality of communications into a format appropriate for the determined one or more devices;
      consolidate the translated plurality of communications into a single communication; and
      communicate the single communication to the determined one or more devices on behalf of the plurality of applications; the delivery module further operable to:
      receive a first status confirmation indicating that the single communication was delivered to a first device of the determined one or more devices and not read on the first device; and
      store the first status confirmation in the second database on behalf of the plurality of applications;
   the adapter is further operable to communicate the single communication to the first device based on the communications history, wherein the communications history comprises the first status confirmation.

2. The system of claim 1, wherein the one or more devices comprise a voice-over-IP device, a cellular telephone, a smart phone, a traditional telephone, a web application, and a computer application.

3. The system of claim 1, the end-user subscription information further indicating a preferred type of the single communication to receive and a preferred time to receive the single communication.

4. The system of claim 1, further comprising a communications module operable to facilitate the communication of the single communication to the determined one or more devices using Session initiation Protocol (SIP).

5. A method comprising:
   receiving, by a queuing module, a plurality of communications from a plurality of applications;
   storing, by the queuing module, the plurality of communications in a first database coupled to the queuing module;
   receiving, by a delivery module, the stored plurality of communications from the queuing module;
   accessing, by the delivery module, end-user subscription information stored in a second database coupled to the delivery module, the end-user subscription information indicating one or more devices to receive the stored plurality of communications;
   accessing by the delivery module, communications history associated with the one or more devices to receive the stored plurality of communications, wherein the communications history is stored in the secured database;
   determining, by the delivery module based on the end-user subscription information and the communications history, the one or more devices to receive the stored plurality of communications;
   receiving, by the adapter from the delivery module, the stored plurality of communications and the determined one or more devices to receive stored the plurality of communications;
   translating, by the adapter, the stored plurality of communications into a format appropriate for the determined one or more devices;
   consolidating, by the adapter, the translated plurality of communications into a single communication;
   communicating, by the adapter, the single communication to the determined one or more devices on behalf of the plurality of applications;
   receiving, by the delivery module, a first status confirmation indicating that the single communication was delivered to a first device of the determined one or more devices and not read on the first device; and storing, by the delivery module, the first status confirmation in the second database on behalf of the plurality of applications; and communicating, by the adapter, the single communication to the first device based on the communications history, wherein the communications history comprises the first status confirmation.

6. The method of claim 5, wherein the one or more devices comprise a voice-over-IP device, a cellular telephone, a smart phone, a traditional telephone, a web application, and a computer application.

7. The method of claim 5, the end-user subscription information further indicating a preferred type of the single communication to receive and a preferred time to receive the single communication.

8. The method of claim 5, further comprising facilitating, by a communications module, the communication of the single communication to the determined one or more devices using Session initiation Protocol (SIP).

9. A system, comprising:
a plurality of applications, each application operable to generate a plurality of communications;
a queuing module comprising a first processor and coupled to a first database, the queuing module operable to:
receive a plurality of communications from a plurality of applications; and
store the plurality of communications in the first database;
a delivery module comprising a second processor and coupled to a second database and the queuing module, the delivery module operable to:
receive the stored plurality of communications from the queuing module;
determine intended recipients of the stored plurality of communications;
access end-user subscription information stored in the second database, the end-user subscription information indicating one or more devices to receive the stored plurality of communications;
access communications history associated with the one or more devices to receive the stored plurality of communications, the communications history is stored in the second database; and
determine, based on the end-user subscription information and the communications history, the one or more devices to receive the stored plurality of communications; and
an adapter comprising a third processor and coupled to the delivery module, the adapter operable to:
receive, from the delivery module, the stored plurality of communications and the determined one or more devices to receive the stored plurality of communications;
translate the stored plurality of communications into a format appropriate for the determined one or more devices;
consolidate the translated plurality of communications into a single communication; and
communicate the single communication to the determined one or more devices on behalf of the plurality of applications; the delivery module further operable to:
receive a first status confirmation indicating that the single communication was delivered to a first device of the determined one or more devices and not read on the first device; and store the first status confirmation in the second database on behalf of the plurality of applications;
the adapter is further operable to communicate the single communication to the first device based on the communications history, wherein the communications history comprises the first status confirmation.

10. The system of claim 9, wherein the one or more devices comprise a voice-over-IP device, a cellular telephone, a smart phone, a traditional telephone, a web application, and a computer application.

11. The system of claim 9, the end-user subscription information further indicating a preferred type of the single communication to receive and a preferred time to receive the single communication.

12. The system of claim 9, further comprising a communications module operable to facilitate the communication of the single communication to the determined one or more devices using Session initiation Protocol (SIP).

13. A non-transitory computer readable medium comprising logic, the logic when executed by a processor operable to:
receive a plurality of communications from a plurality of applications;
store the plurality of communications in a first database coupled to the queuing module;
receive the stored plurality of communications from the queuing module;
access end-user subscription information stored in a second database coupled to the delivery module, the end-user subscription information indicating one or more devices to receive the stored plurality of communications;
access communications history associated with the one or more devices to receive the stored plurality of communications, wherein the communications history is stored in the secured database;
determine, based on the end-user subscription information and the communications history, the one or more devices to receive the stored plurality of communications;
translate the stored plurality of communications into a format appropriate for the determined one or more devices;
consolidate the translated plurality of communications into a single communication;
communicate the single communication to the determined one or more devices on behalf of the plurality of applications;
receive a first status confirmation indicating that the single communication was delivered to a first device of the determined one or more devices and not read on the first device; and
store the first status confirmation in the second database on behalf of the plurality of applications;
communicate the single communication to the first device based on the communications history, wherein the communications history comprises the first status confirmation.

14. The medium of claim 13, wherein the one or more devices comprise a voice-over-IP device, a cellular telephone, a smart phone, a traditional telephone, a web application, and a computer application.

15. The medium of claim 13, the end-user subscription information further indicating a preferred type of the single communication to receive and a preferred time to receive the single communication.

16. The medium of claim 13, the logic further operable to utilize the Session Initiation Protocol (SIP) to communicate the single communication to the determined one or more devices.

\* \* \* \* \*